5 Sheets—Sheet 1.

C. YOUNG

Assignor to A. G. MACK.

Crocheting Machine for Making Looped Fabrics.

No. 9,447. Reissued Nov. 2, 1880.

*Attest:*

Ephraim Banning

Charles C. Linthicum

INVENTOR:

Charles Young,

By P. L. Dyrenforth,

*Attorney.*

C. YOUNG

Assignor to A. G. MACK.

Crocheting Machine for Making Looped Fabrics.

No. 9,447. Reissued Nov. 2, 1880.

*Attest:*

Ephraim Banning

Charles C. Luthicum

INVENTOR:

Charles Young

By P. C. Dyrenforth

Attorney

C. YOUNG.

Assignor to A. G. MACK.

Crocheting Machine for Making Looped Fabrics.

No. 9,447. Reissued Nov. 2, 1880.

*Attest:*

Ephraim Banning

Charles C. Linthicum

INVENTOR:

Charles Young,

By P. C. Dieuaforth

*Attorney.*

C. YOUNG.
Assignor to A. G. MACK.
Crocheting Machine for Making Looped Fabrics.
No. 9,447. Reissued Nov. 2, 1880.
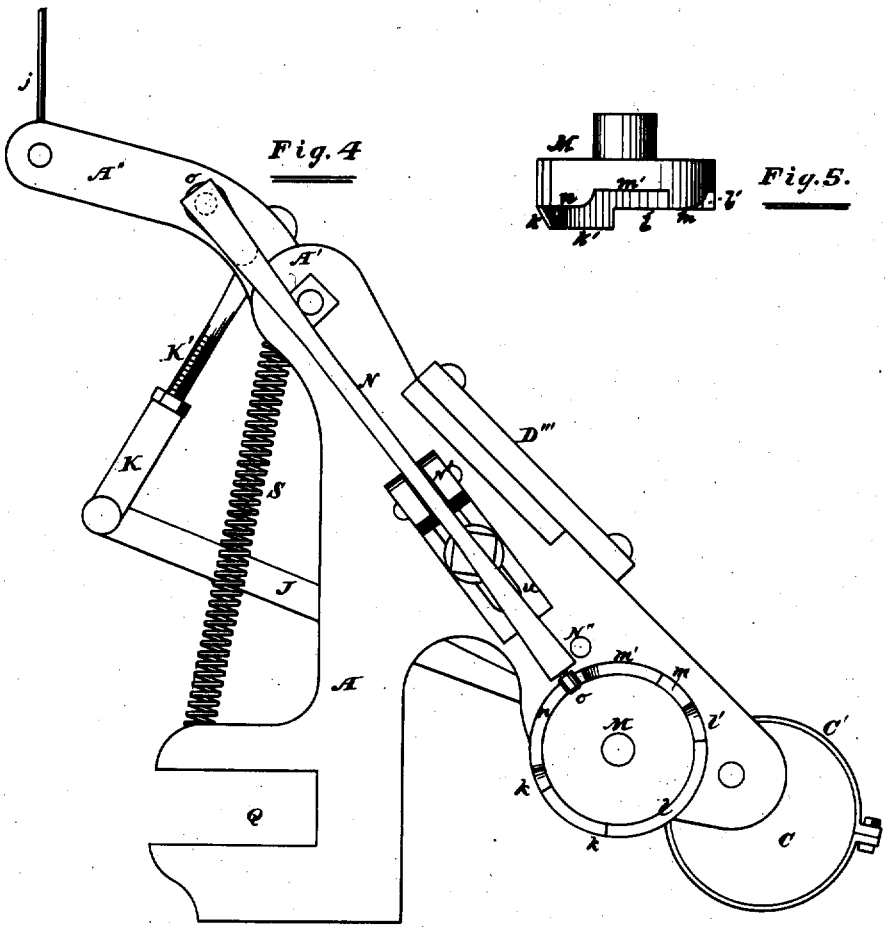
Attest:
Ephraim Banning
Charles C. Linthicum
INVENTOR:
Charles Young,
By R. B. Dyrenforth
Attorney C. YOUNG.
Assignor to A. G. MACK.
Crocheting Machine for Making Looped Fabrics.
No. 9,447. Reissued Nov. 2, 1880.
Fig. 6.
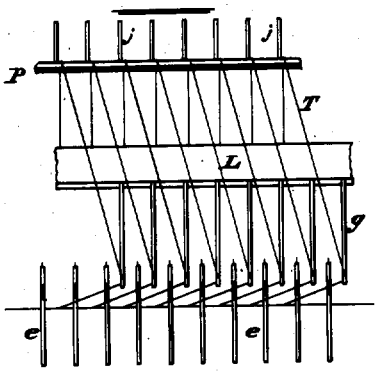
Fig. 7.
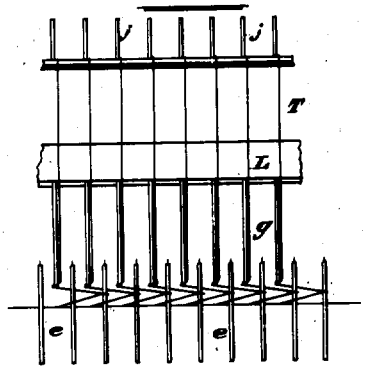
Fig. 9.
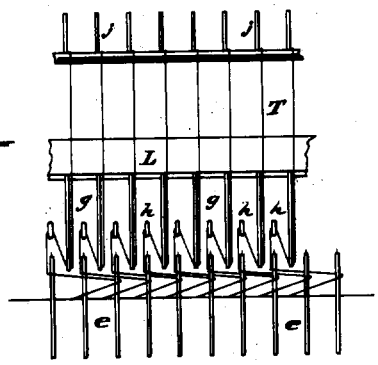
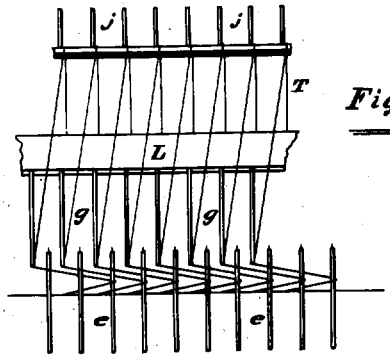
Fig. 8.
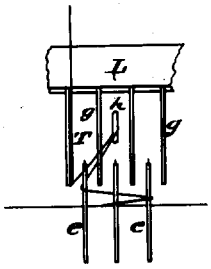
Fig. 10.
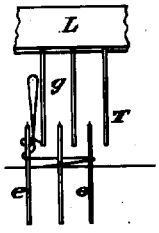
Fig. 11.
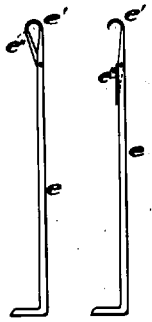
Fig. 12.
Fig. 13.
Attest:
Ephraim Banning.
Charles C. Linthicum
INVENTOR:
Charles Young,
By R. L. Dyrenforth,
Attorney.

UNITED STATES PATENT OFFICE.

CHARLES YOUNG, OF CHICAGO, ILLINOIS, ASSIGNOR TO ALBERT G. MACK, OF SAME PLACE.

CROCHETING-MACHINE FOR MAKING LOOPED FABRICS.

SPECIFICATION forming part of Reissued Letters Patent No. 9,447, dated November 2, 1880.

Original No. 209,786, dated November 12, 1878. Application for reissue filed July 17, 1880.

*To all whom it may concern:*

Be it known that I, CHARLES YOUNG, of the city of Chicago, in the county of Cook and State of Illinois, have invented certain new and useful Improvements in Looped Fabrics and Crocheting-Machines for Making the Same, of which the following is a full description, reference being had to the accompanying drawings, in which—

Figure 1:
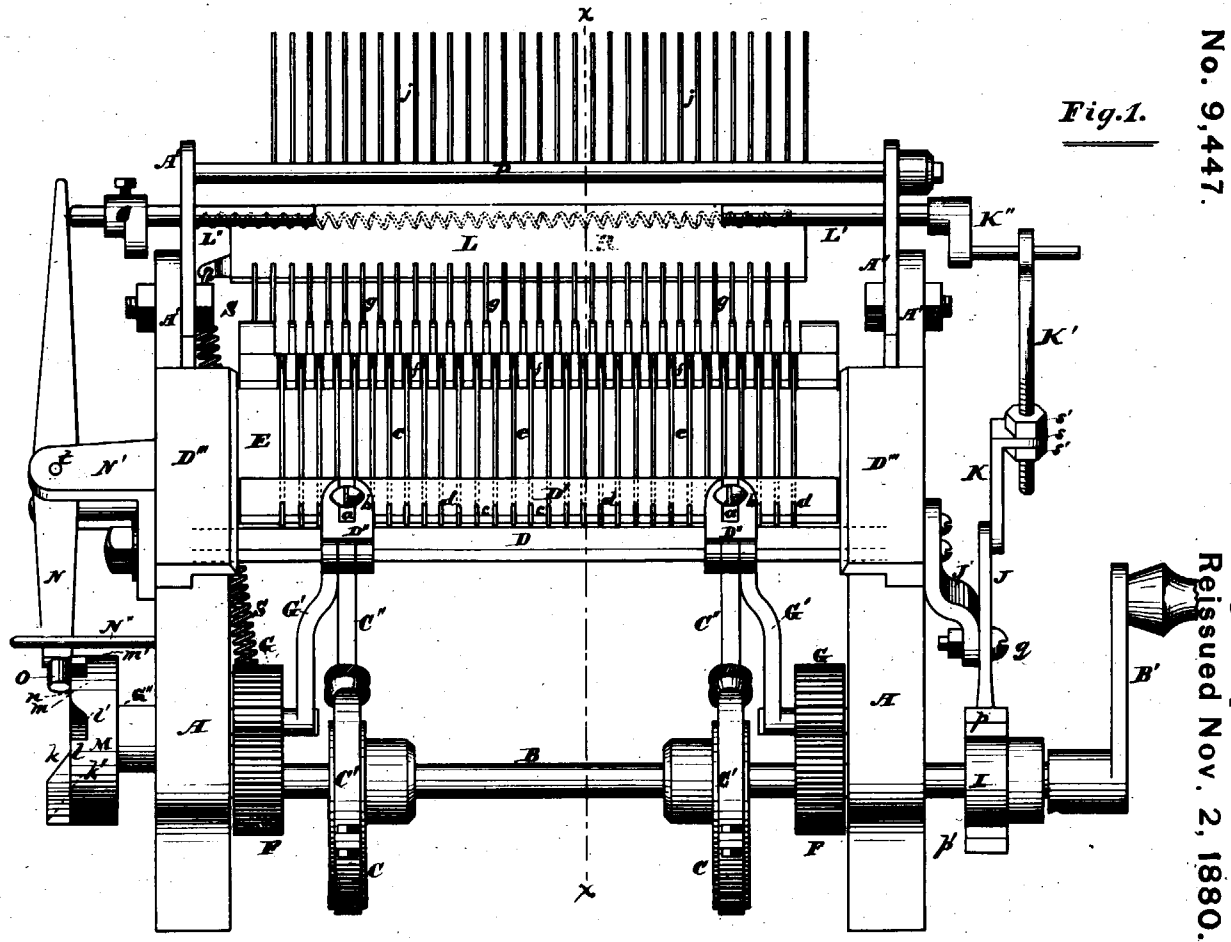
Figure 2:
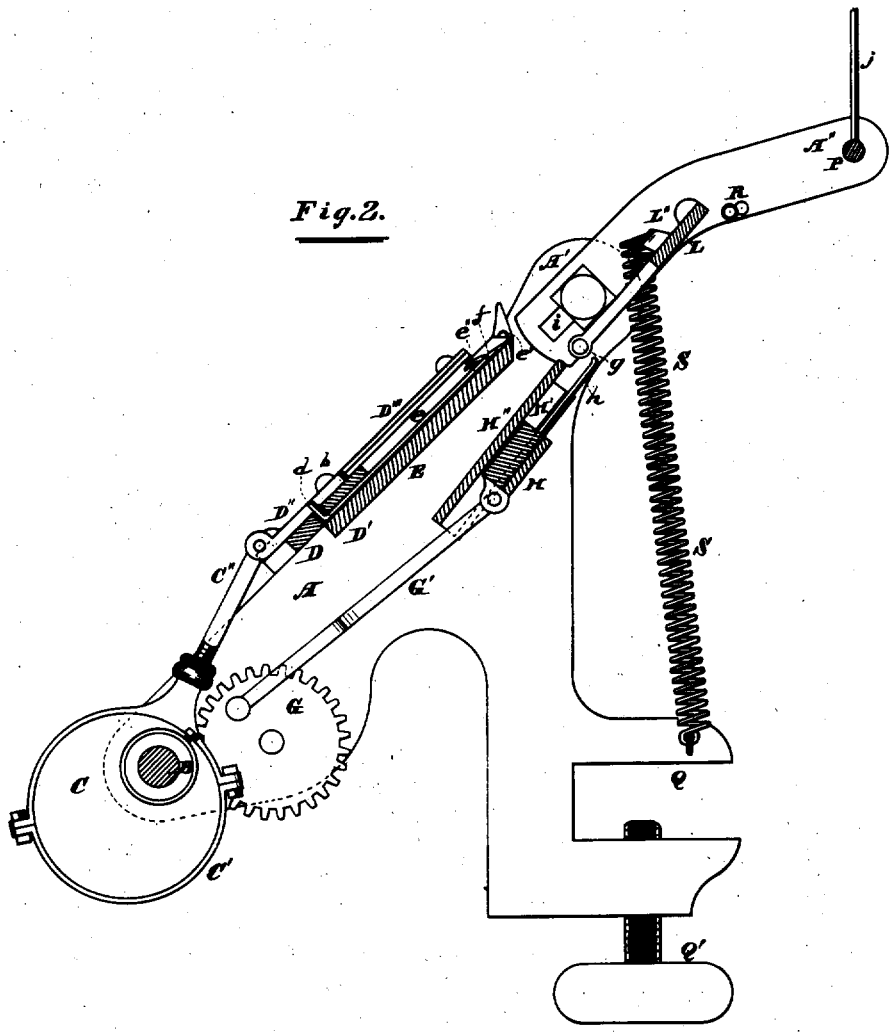
Figure 3:
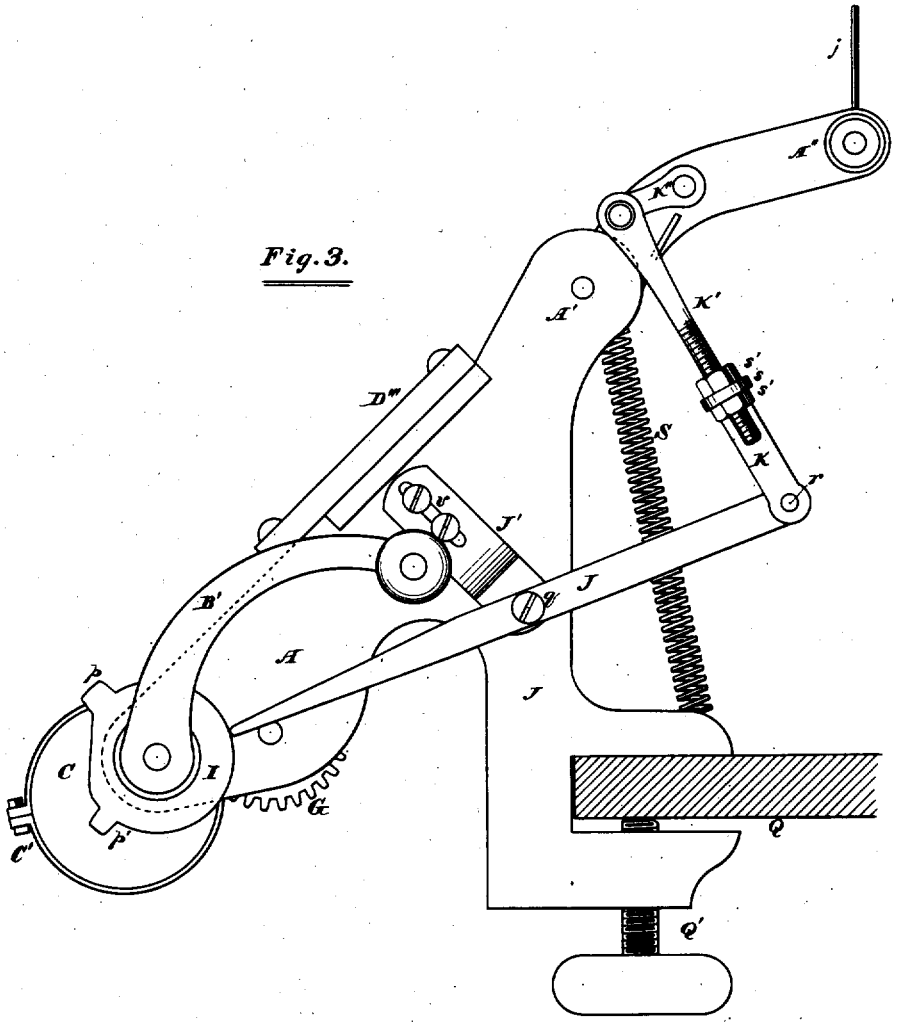

Figure 1 is a front elevation of my improved machine; Fig. 2, a vertical cross-section on line *x x*, Fig. 1; Figs. 3 and 4, end elevations; Fig. 5, a detail view of the cam for operating the yarn-carrying arms; Figs. 6, 7, 8, 9, 10, and 11, views showing the different positions of the yarn while making the fabric; and Figs. 12 and 13, elevations of the needle, showing the latch opened and closed.

This invention relates to improvements in the class of machines especially adapted for making loop-stitched fabrics, whereby I am enabled to produce said fabric from a single series of threads; and the invention consists in the combination, with a single series of loop-pins, of a single series of needles and a single series of oscillating and laterally-reciprocating guide-arms and operating mechanism to give the required movements to the arms, needles, and loop-pins to form the stitches and loops from a single series of threads and knot the loops firmly into the body of the fabric, whereby they are incapable of being drawn or raveled out, and thus forming a new article of manufacture, all as hereinafter more fully set forth.

In the drawings, A represents the standards or supporting-frame; A′, the upper end thereof; A″, the extensions of the standards; B, the driving-shaft; B′, the crank for operating the shaft; C, the eccentrics; C′, the rings or straps; C″, the connecting-rods; D, the sliding bar; D′, the needle-retaining bar; D″, the attaching-ears; D‴, the guide-plates for the bar D; E, the back plate for the needles; F G, the gear-wheels; G′, the connecting operating-rods; H, the sliding bar carrying the loop-pins; H′, the guide-plates for the bar H; H″, the dividing or partition plate; I, the cam-wheel for raising the yarn-arms; J, the operating arm or lever; J′, the support or bracket for J; K K′, the adjustable connecting-rod; K″, the crank; L, the yarn-arms-supporting bar; L′ L″, the spindles of the bar L; M, the cam-wheel for moving the yarn arms or frame to the right and left; N, the operating bar or lever; N′, the support or ears for the bar N; N″, the stop for the lever or bar N; O, the stop for engaging with the end A′ of the standard; P, the rod or bar carrying the guide-pins; Q, the slots or openings in the standards for passing over the edge of a table or bench; Q′, the set-screw; R, the spring for keeping the end L″ of the bar L in contact with the bar or lever N; S, the spring for throwing the yarn-arms back of the loop-pins; T, the yarn or material; *a*, the slot in the ears D″; *b*, the set-screws; *c*, the space for the heels of the needles; *d*, the heels of the needles; *e*, the shanks of the needles; *e′*, the needle-hooks; *e″*, the needle-latches; *f* the projections on the plate E, forming guides for the needles; *g*, the yarn-carrying guide-arms; *h*, the loop-pins; *i*, the slots for adjusting the arms A″; *j*, the guide-pins; *k k′ l l′ m m′ n*, the projections and depressions or notches in the cam-wheel M; *o*, the anti-friction roller on the end of the arm or lever N; *p p′*, the projections on the wheel I; *q*, the pivot for the arm or lever J; *r*, the pivot for the connecting-bar; *s s′*, the ear and set-nuts for connecting K K′ together; *t*, the pivot for the arm or lever N; *u*, the slot for adjusting the ears or support N′; *v*, the slot for adjusting the support J′.

The frame or standards A may be made of cast-iron or other suitable material, and of any desired form or shape to receive and furnish a support for the operating devices, the size of the standards and their distance apart depending on the size of the machine. Each standard, as shown at its lower end, is provided with an opening, Q, by means of which and a set-screw, Q′, the device can be secured to a table or bench, the edge of the table or bench entering the slots or openings Q. The upper portions, A′, of these standards are not as thick as the lower portions, and are rounded off at their tops, and to them are secured arms or supports A″, which extend back some distance from the standards, as shown in Fig. 2.

The shaft B has its bearings in the lower ends of the standards A, and one end projects some distance beyond the standard, and to it is secured a crank, B′, or other device by means of which the shaft can be rotated.

On the end of the shaft, between the crank B′ and the standard, is located a cam wheel or disk, I, rigidly secured to the shaft, so as to revolve therewith in any suitable manner, which wheel is provided with two projections, *p p′*, located a little distance apart on the edge or periphery of the wheel or disk, the metal of the cam, disk, or wheel between the projections being cut away, as shown in Fig. 3, so as to leave a lower surface than the balance of the periphery of the cam wheel or disk.

On the end of the shaft G″ that supports the gear-wheel G is located another cam wheel or disk, M, also rigidly secured to the shaft, so as to revolve therewith, the outer face of which is provided with a flange extending around the circumference of the disk, which flange is provided with a series of projections and depressions or notches, *k k′ l l′ m m′ n*, the depressions extending to the same depth and the projections varying in height, *k′* being higher than the others.

Between the standards A on the shaft B are rigidly secured two eccentrics, located at the proper distance apart and revolving with the shaft, each eccentric being provided with its ring or strap C′ and connecting-rod C″, which may be of any of the well-known forms of construction suitable for the purpose of operating the needles.

The upper ends of the connecting-rods C″ are pivoted, as shown, to ears D″, secured to or formed with the bar D, which moves in suitable guideways, D‴, secured to the standards, which ears, at their upper ends, are provided with slots *a*, by means of which and suitable set-screws, *b*, the bar D′ (which is located above the bar D and between the inner faces of the guideways or standards) can be connected with the bar D, so as to move therewith, the object of the slots *a* and set-screws being to so adjust the bar D′ as to leave the required space, *c*, for the reception of the heels *d* of the needles, which needles consist of a shank, *e*, a hook, *e′*, and a retaining and discharging latch, *e″*, as shown in Figs. 12 and 13, and may be of the required length and construction suitable for holding and releasing the stitch formed thereon, as hereinafter specified. The shanks *e* of these needles rest upon a back or supporting plate, E, located beneath the bars D D′, and are secured in any suitable manner to the standards A.

The number of needles will depend upon the size of the machine and width of the fabric which it is desired to form.

The upper end of the plate E is provided with a series of projections, *f*, having inclined points projecting a little distance above the upper face of the plate E, between which projections *f* are grooves or openings, which form guideways or passages for the needles, which are moved up and down by the action of the eccentrics C.

On the shaft B, next to the inner face of each standard A, is located a gear-wheel, F, rigidly secured to the shaft and revolving therewith, which wheels F engage with gear-wheels G, having their bearings on the standards above and to one side of the shaft, and to which are secured the ends of the bars G′, the attachment being made at one side of the centers of the wheels, so as to give the rods the proper eccentric movements, the other ends of the bars being secured in any suitable manner to the bar H, which moves in suitable guideways, H′, suitably secured to the standards A, and supports the loop-pins *h*, which may be of any desired length, located in the bar at the required distance apart for the passage of the yarn-arms when forming the loop.

Between the plate E and the bar H is a plate, H″, secured to the standards, and so located as to leave a space between it and the plate E for the passage of the fabric when formed.

The arm or lever J is pivoted at *q* to a support or bracket, J′, secured to the side of the standard, and is so arranged that its lower end will engage with the projections *p p′* and come in contact with the face of the wheel J after it has passed *p′*, the support J′ being provided with a slot, *v*, to enable the proper adjustment for this purpose to be had. The other end of this lever or arm J is pivoted at *r* to a connecting-rod, which, as shown, consists of two sections, K K′, united by means of the ear or projection *s* on the part K and the set-nuts *s′ s′*, so that the length of the rod can be adjusted to give the desired movement to the crank K″, with which the upper end of the section K′ is connected, which crank is firmly secured to the end of the flat bar L in any permanent manner, so as to form an axis for the bar L, to the other end of which is firmly secured another rod or spindle, L″, which forms the other axis therefor, the ends of the rods projecting beyond the upper portion, A″, of the standards in which they have their bearings. To this flat bar or plate L are rigidly secured arms or supports *g*, the outer ends of which are provided with holes, which arms are arranged at a little distance apart, their location being such as to allow the arms to pass between the needles properly.

The arm or lever N is pivoted at *t* between the ears of support N′, secured to the standard A at the opposite end of the machine, the ears or support having a slot, *u*, by means of which the arm or lever N can be adjusted to engage properly with the wheel M and the end of rod or spindle L″.

The lower end of the arm or lever N is provided with an anti-friction roller, *o*, which engages with the projections and depressions on the flange of the cam-wheel M, and the upper end comes in contact with the projecting end of the spindle L″, which is kept in contact with the arm or lever by the action of the spring R, or in some other suitable manner, one end of which is secured to the bar L and the other to the standard A″, so that the force of said spring will be exerted in the direction of the lever N.

The end of the lever is prevented from slipping off the rod L″, when the lever is acted upon by the cam-wheel M, by means of a pin or stop, N″, so located as to keep the lever in position.

On the projecting end of L″ is arranged a stop, O, which engages with the end A′ of the standard, and prevents the bar L from being depressed except at the proper time.

Above the bar L, and supported by the arms A″, adjustably secured to the standards by the slots *i* and set-screws or bolts, is a rod or bar, P, in which is arranged a series of pins, *j*, at the proper distance apart.

The spring R is located back of the bar L and parallel therewith. The vertical spring S is secured at its upper end to the lower corner of the bar L, and at its other end to that portion of the standard which is provided with the slot Q.

Other forms of springs than the coil-springs R S may be used, their arrangement being such as to keep the bar L so as to be operated by the lever or arm N and to be depressed at the proper time.

The arrangement and location apart of the arms *g*, loop-pins *h*, and guide-pins *j* must correspond with, or nearly with, the location apart of the needles, so as to bring them in the proper position to enable the arms *g* to give the necessary right-and-left and up-and-down movements to the yarn or other material to form the stitches and loops.

Other devices than those shown for actuating the arms *g* and other parts may be employed, their construction and arrangements being such as to give the required movements to the parts.

The location and arrangements of the actuating devices for the yarn-arms, needles, and loop-holding pins and the movements of these several parts relative to each other will be understood from a description of the operation, which is as follows:

The yarn or material, T, from which the fabric is to be made passes from suitably-located bobbins over the bar P, between the guide-pins *j*, over the bar L, down by the sides of the arms *g*, through the openings in the ends of the arms or fingers *g*, as many strands of yarn or other material being employed as required for the width of the fabric. The ends of each strand, after passing through the openings in the arms or fingers *g*, are passed through the opening or space between the plates E and H″. The parts are then to be brought to a position where the roller *o* will be acted upon by the incline *k* and the end of the arm or lever J will be engaged by the projection *p* on the wheel I, when the machine is ready for operation. As the crank B′ is turned the shaft B will be revolved, which also revolves the devices thereto attached, causing the projection *p* on the wheel or disk I to depress the lower end of the arm or lever J, which, through the connecting-rod K K′ and crank K″, raises the front edge of the bar L, and with it the arms *g*, carrying the arms between and above the needles, and with them the yarn. The roller *o* on the arm or lever N then comes in contact with and rides up the incline *k*, carrying the lower end of the arm or lever N to the left and the upper end to the right, which end gives a corresponding movement to the bar L and the arms *g* thereon, the extent of the movement being sufficient to carry the arms *g* to the right over two needles, and with them the yarn, the needles at this time having been raised by the action of the eccentrics C, and the loop-pins having been carried down by the action of the wheels G and rods G′, so that the yarn will be carried over two needles, as shown in Fig. 6, then between and back thereof as the end of the lever J leaves the projection *p*, the arms *g* being prevented from being carried too far back or down by the stop O, which comes in contact with the upper end of A′ as the arm J leaves *p*, and is between the two projections *p p′* on the cam wheel or disk I, and not in contact with the face of the disk at that point by reason of its being cut away, as before described. The end of the arm or lever J then comes in contact with the projection *p′* on the cam wheel or disk I, again raising the bar L and the arms *g* thereon, in the same manner as *p*, between and above the needles, said arms being again returned between the same needles. As the arm leaves the projection *p′* the roller *o* leaves the projection *k′*, on which it has been traveling, and comes in contact with the projection *l*, throwing the upper end of the arm or lever N to the left the same distance that it was carried to the right by the incline *k*, the bar L, and with it the fingers or arms *g*, with the yarn held thereby, being also thrown to the left by the action of the spring R, carrying the yarn to the left beneath the needles the same distance that it was carried to the right, as shown in Fig 7. The needles are then withdrawn and partly raised again by the action of the eccentrics, the yarn being caught in their hooks, and the arms *g* being held in position by reason of the contact of the end of the arm or lever J with the face of the wheel or disk after it leaves *p′*, and until the end of the arm again comes in contact with the projection *p*, raising the arms *g* between and above the needles, as before described. At this time the roller *o*, which has been traveling on the face of *l*, leaves it, thus carrying the upper end of the arm or lever N to the left, allowing the spring R to throw the bar L, and with it the arms *g* and yarn carried thereby, to the left, which operation takes place while the arms *g* are elevated. The distance traveled by the arms in this movement must be sufficient to carry the yarn over a single needle, as shown in Fig. 8. The end of the arm or lever J then leaves the projection *p* and comes between the two projections *p p′*; but as the arm is not in contact with the face of the cam-disk at this point and the stop O does not engage with the end of A′, the action of the spring S will throw the arms *g* back of the pins *h* on the bar H, which have been raised by the action of the wheels G and rods G′, the needles also having been raised by the eccentrics. The roller *o* then rides up the inclined face of the projection *m* on the cam-wheel M, carrying the upper end of the bar or lever N to the right, and with it the bar L and arms *g* thereon, and the yarn carried by the arms, a sufficient distance to carry the yarn around the pin next to each arm *g* at the right, as shown in Fig. 9. Then the end of the arm or lever J again comes in contact with the projection *p′*, raising the arms *g*, as before described. While these arms are raised the roller *o* leaves the face of the projection *m*, on which it has been traveling, and enters the notch or depression *m′*, which throws the upper end of the bar or lever N to the left and allows the spring R to act to carry the bar L, and with it the arms *g* and yarn carried thereby, to the left a distance sufficient to carry the yarn over a single needle, as shown in Fig. 10. The end of lever J then leaves the projection *p′* and comes in contact with the face of the cam-disk I, throwing the arms *g* back between the pins *h* and the needles, which are both raised at this time by the action of their actuating devices, where they are held by the contact of the end of the lever J with the disk until the end of lever J again comes in contact with the projection *p*. The needles are withdrawn right after the arm leaves *p′* by the eccentrics, and as the hooks enter the spaces between the projections *f* on the plate E the roller *o* will ride up the end of the projection *n*, carrying the upper end of the arm N to the right and with it the bar L, arms *g* thereon, and yarn carried by the arms. The distance traversed is sufficient to carry the arms *g*, which are below the needles, to the right far enough to carry the yarn under one needle, which completes the operation of a single loop and its holding-stitch, as shown in Fig. 11. The arm J then comes in contact with the projection *p* again, and the roller *o* rides up the incline *k*, and the operations before described are repeated, and such movements are continued until the fabric is completed, the action of the stitches, as the needles are raised and lowered, opening and closing the latches, so as to catch the yarn on the hooks and allow the completed stitch to be discharged at the proper time. The yarn is carried by the arms up and to the right over two needles, then to the left under two needles, then the space over another needle to the left, then back of and around the loop-pins, then up and to the left over a single needle, and then to the right under a single needle at each complete operation; and any other form of actuating devices than those shown and described which will give such movements to the yarn may be used in connection with other devices for giving the movements described to the needles and loop-holding pins or devices at the proper time; or the devices might be so arranged as to carry the yarn over two needles to the left, and the other movements reversed accordingly.

What I claim as new, and desire to secure by Letters Patent, is—

1. As a new article of manufacture, a loop-stitched fabric formed of a single course of threads without warp, and having its loops incapable of being drawn or raveled out, substantially as described.

2. In a machine for the manufacture of loop-stitched fabrics, the combination, with a single series of loop-pins, of a single series of needles and a single series of oscillating and laterally-reciprocating guide-arms and operating mechanism, whereby each thread is carried by said arms up and to the right over two needles, then to the left under two needles, then the space over another needle to the left, then back of and around the loop-pins, then respectively up and to the left, over and down to the right, under a single needle at each complete operation, so as to form a single series of loops and holding-stitches, substantially as specified.

3. The combination of the crank-shaft B, cam-wheel M, shaft G″, that supports the gear-wheel G, lever N, pivoted to the frame, cam-wheel I, arm or lever J, pivoted to the frame, connecting-rod K K′, and crank K″, and bar L, carrying the guide-arms, substantially as described.

4. The combination of the crank-shaft B, eccentrics C, having the rings or straps C′, connecting-rods C″, sliding bar D, needle-retaining bar D′, and needle-bed E, having the guides *f*, the whole being constructed and arranged to operate substantially as described.

5. The bar L, provided with the arms *g*, cam-wheel I, provided with the projections *p p′*, bar J, connecting-rod K K′, crank K″, cam-wheel M, provided with the projections and depressions *k k′ l l′ m m′ n*, rod or arm N, friction-roller *o*, rod L″, stop O, and springs R S, in combination with the eccentrics C, bands C′, pitman C″, frame D D′, carrying the needles *e*, wheels F G, pitmen G′, and bar H, carrying the pins *h*, and a suitable supporting-frame, all constructed and operating substantially as and for the purposes specified.

CHARLES YOUNG.

In presence of—
HUGH D. HUNTER,
P. C. DYRENFORTH.